US006100608A

United States Patent [19]

Takahashi

[11] Patent Number: 6,100,608

[45] Date of Patent: Aug. 8, 2000

[54] PROXIMITY SWITCH

[75] Inventor: Hiroshi Takahashi, Sagamihara, Japan

[73] Assignee: Japan Pneumatics Co., Ltd., Tokyo, Japan

[21] Appl. No.: 09/147,671

[22] PCT Filed: Jun. 13, 1997

[86] PCT No.: PCT/JP97/02050

§ 371 Date: May 5, 1999

§ 102(e) Date: May 5, 1999

[87] PCT Pub. No.: WO98/57342

PCT Pub. Date: Dec. 17, 1998

[51] Int. Cl.[7] .......... H02B 1/24

[52] U.S. Cl. .......... 307/125; 324/156

[58] Field of Search .......... 335/205, 208; 200/19 M, 83 L; 340/815.71, 657; D13/133; 307/112, 125; 324/156

[56] References Cited

U.S. PATENT DOCUMENTS 5,184,064 2/1993 Vicknair et al. .......... 324/156

5,886,332 3/1999 Piesko .......... 235/472

FOREIGN PATENT DOCUMENTS 55-80707 6/1980 Japan .

3-88242 9/1991 Japan .

*Primary Examiner*—Fritz Fleming
*Assistant Examiner*—Robert L. Deberadinis
*Attorney, Agent, or Firm*—Oblon, Spivak, McClelland, Maier & Neustadt, P.C.

[57] ABSTRACT

A magnetic induction, light-emitting display type proximity switch is used for displaying the operation position of a fluid pressure cylinder, float, and the like. The proximity switch is so constructed that an electric circuit including a magnetic induction switch 12*a* and a light emitting device is enclosed in a molded body made of a light-transparent resin. Since a resin molded construction using a light-transparent resin is used in place of a resin case, the proximity switch is inexpensive and small in size, has high waterproofness and a wide light emission range, and can easily accommodate the diversification of shape.

15 Claims, 8 Drawing Sheets

PROXIMITY SWITCH

Continuation of PCT International application number PCT/JP97/02050filed Jun. 13, 1997.

BACKGROUND OF THE INVENTION

1. Field of the Invention

The present invention relates to a magnetic induction, light-emitting display type proximity switch used for displaying the operation position of a fluid pressure cylinder, float, and the like.

2. Discussion of the Background

Fluid pressure cylinders including hydraulic cylinders have been used frequently for various automatic machines as a drive source. For the purpose of operation display, the fluid pressure cylinder is used in combination with, for example, magnetic induction, light-emitting display type proximity switch. A conventional magnetic induction, light-emitting display type proximity switch and its application mode are shown in FIG. 8.

A proximity switch 30 is so constructed that electronic components such as a reed switch and an LED 32 are enclosed in a resin case 31, and a cord 33 is pulled out from the case to the outside of the case. When being used for a hydraulic cylinder 40, the proximity switch 30 is fixed to the outside surface of the cylinder 40 by using a band 41 or the like. The LED 32 faces the outside of the resin case 31 through an opening provided in the resin case 31 so as to be seen from the outside. On the other hand, a permanent magnet is installed on a piston of the hydraulic cylinder 40.

When the hydraulic cylinder 40 is operated, and the piston reaches the proximity switch 30, the reed switch in the resin case 31 is operated by the induction of the permanent magnet, and the LED 32 is energized, so that the piston position is displayed.

The hydraulic cylinder 40, which is used as a drive source for various automatic machines, is often placed in an atmosphere where liquids such as cutting oil and coolant are scattered. For this reason, the proximity switch 30 mounted to the hydraulic cylinder 40 is also required to have high waterproofness. From this point of view, a filler is often put in the resin case 31, which also serves as assembly fixing means for the case 31. Also, in order to further improve the waterproofness and to increase the mechanical strength, a proximity switch in which a metallic cap is put over the resin case 31 has been developed.

However, the conventional proximity switch has problems described below.

If the proximity switch is used for a long period of time in an atmosphere where liquids such as cutting oil and coolant are scattered, even in the switch in which a filler is put in the resin case 31, the entrance of liquids may cause poor insulation and therefore malfunction caused by poor insulation. This is because the LED 32 is exposed to the outside of the resin case 31 and a gap is inevitably produced here, and also a thermal change in volume and change in physical properties caused by the difference in material properties between the resin case 31 and the filler, and a change in volume and change in physical properties caused by the contact with cutting oil, coolant, and the like liquid produce a gap between the resin case 31 and the filler, or create cracks in the filler, so that the entrance of liquids from these gaps causes poor insulation. Although the proximity switch in which metallic cap is put has relatively high waterproofness, it has nevertheless a danger of poor insulation caused by the entrance of liquids. For these reasons, it has been difficult to use the conventional proximity switch in water.

The resin case 31 is high in cost, and requires manpower for assembling the case 31 and for putting the filler in the case 31, so that the cost of the resin case 31 is considerably high as compared with the costs of principal components such as the reed switch and LED 32. The proximity switch in which the metallic cap is used is especially high in cost.

The proximity switch is inconveniently made larger by the use of the resin case 31. Also, the shape of the proximity switch is limited because the resin case 31 is expensive and has a difficulty in being diversified in shape.

Since the LED 32 is exposed to only one direction from the resin case 31, and the light emission can be checked only from the exposed side in a dot form, so that it is essentially difficult to make this check, and sometimes the light emission cannot be seen when the proximity switch is used in a limited space.

SUMMARY OF THE INVENTION

An object of the present invention is to provide a magnetic induction, light-emitting display type proximity switch that can solve all of these problems, that is, a magnetic induction, light-emitting display type proximity switch that is inexpensive and small in size, has high waterproofness and a wide light emission range, and can easily accommodate the diversification of shape.

DISCLOSURE OF THE INVENTION

To achieve the above object, the proximity switch in accordance with the present invention comprises: a molded body made of a light-transparent resin; an electric circuit including a magnetic induction switch and a light emitting device, enclosed in the molded body in the process of molding; and a cord pulled out from the electric circuit to the outside of the molded body.

By this configuration, a resin case is omitted, so that the manufacturing cost of the proximity switch can be reduced, the size thereof can be decreased, and the proximity switch can easily accommodate the diversification of shape. Also, since the light emitting device is visible through the molded body made of a light-transparent resin, the light emission range is expanded dramatically.

The proximity switch in accordance with the present invention can be fixed to a to-be-mounted surface by banding. If a band is put directly on the molded body, however, there is a fear that the molded body is deformed by the tightening force, service environment temperature, and the like, thereby deteriorating the switch performance. For this reason, it is preferable to attach a mounting member such as a mounting piece to the molded body.

By this configuration, the proximity switch can be mounted without applying an external force to the molded body. As a result, the switch performance can be stabilized. In this case as well, the mounting member can easily be attached to the molded body by embedding a part of the mounting member in the molded body.

When the molded body is fixed to the to-be-mounted surface directly by using a band without the use of the mounting member, it is preferable to reinforce the molded body by means of a tubular sheathing member made of a non-magnetic material to increase the rigidity of the molded body.

By this configuration, the decrease in switch performance is avoided even if the switch is mounted by the application of an external force.

In this case, a part of the molded body must be exposed from the sheathing member so that the molded body is visible from the outside. Thereby, an excellent light emitting property is secured though the sheathing member is used.

When a part of the molded body is exposed from the sheathing member, the light emitting device should preferably be disposed on the inside of the sheathing member, rather than being disposed at the exposed portion. This is because when the light emitting device is disposed on the inside of the sheathing member, the light is reflected on the inside surface of the sheathing member, so that the light emitting property of the exposed portion is enhanced.

For the cord, in order to prevent the cord from slipping off, it is preferable that at the end portion of the cord enclosed in the molded body, an annular slip-off preventive member be fitted on the cord so as to intrude into the surface of the cord. By this configuration, the annular slip-off preventive member intrudes into the molded body on one side, so that the slip-off of the cord can be prevented simply and securely.

The slip-off preventive member may be any of a resin ring, rubber ring, metal ring, and the like; the material thereof is not subject to any special restriction.

The shape of the molded body is not subject to any special restriction. It may be a rectangular parallelepiped (including a cube), a circular column, or other shapes. When the molded body has a rectangular parallelepiped shape, the sheathing member has a square tube shape, while the molded body has a columnar shape, the sheathing member has a cylindrical shape.

The material of the light-transparent resin used for the molded body is also not subject to any special restriction. Any material that fulfils the function in terms of durability, hardness, light transparent property, and the like may be used. The light-transparent resin need not be colorless and transparent, and a colored light-transparent resin may be used. In the case of colored resin, although the color of the emitted light can be controlled so as to be the resin color, the resin color and the color of the emitted light from the light emitting device are preferably in the same class from the viewpoint of light emitting property.

DETAILED DESCRIPTION OF THE PREFERRED EMBODIMENTS

Embodiments of the present invention will be described below with reference to the accompanying drawings.

Figure 1:
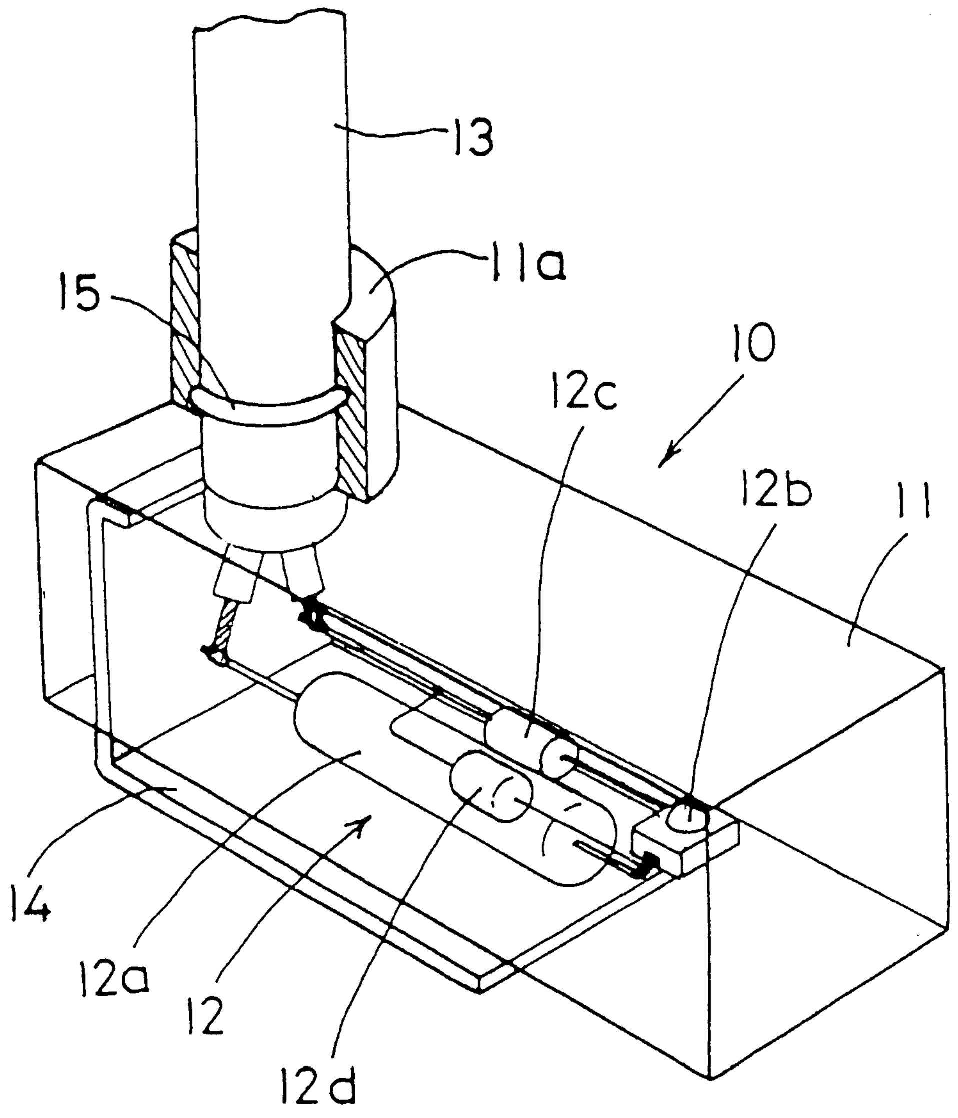
FIG. 1 is a perspective view of a proximity switch in accordance with a first embodiment of the present invention.
Figure 2A:
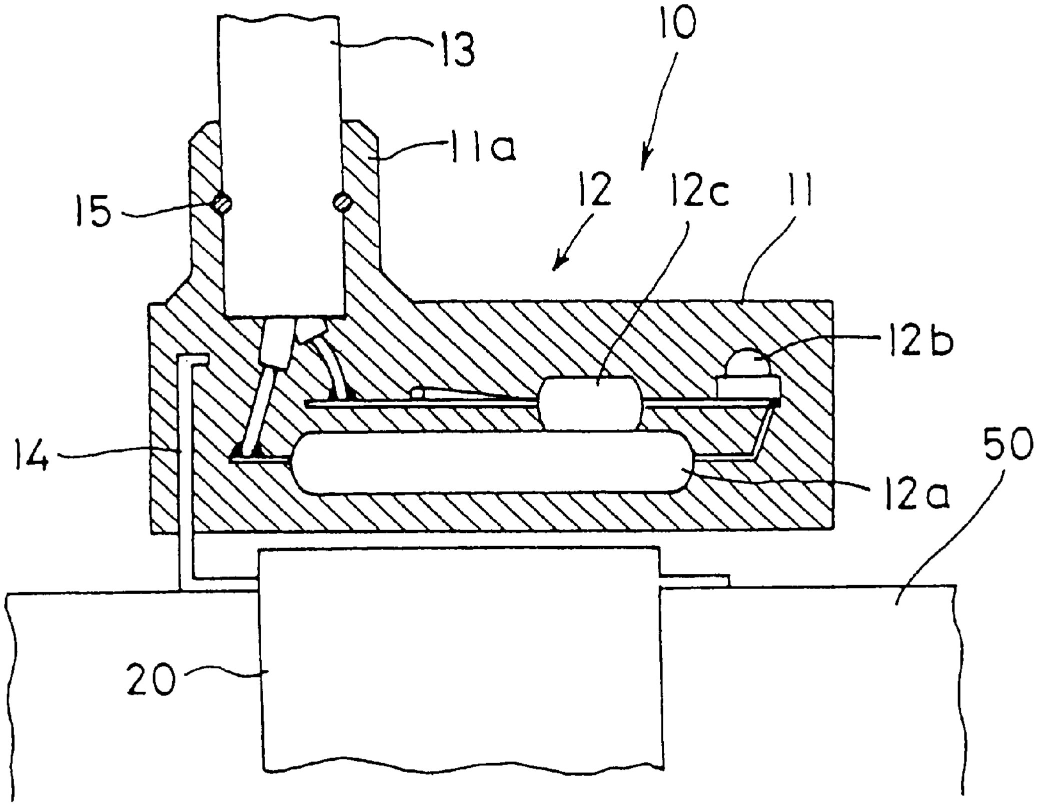
FIG. 2(*a*) is a longitudinal sectional view of a proximity switch in accordance with a first embodiment of the present invention, and FIG. 2(*b*) is an electric circuit diagram.
Figure 2B:
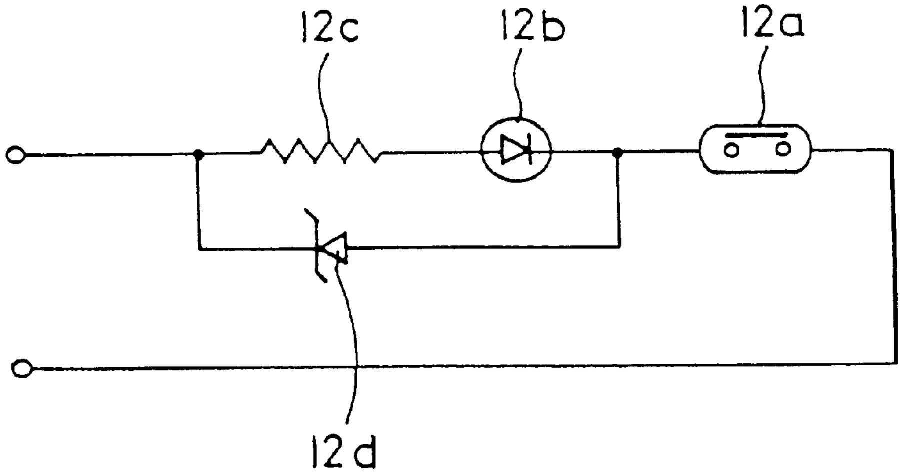

FIGS. 1 and 2 show a first embodiment of the present invention. A proximity switch 10 of this embodiment includes a rectangular parallelepiped molded body 11, an electric circuit 12 enclosed in the molded body 11, a cord 13 pulled out from the electric circuit 12 to the outside of the molded body 11, and a mounting member 14 attached to the molded body 11.

The molded body 11 is made of a light-transparent colored resin, and the rear upper surface thereof projects upward into a cylindrical form so as to secure a sufficient contact area with the cord 13 to enhance the property for sealing the cord 13 and other properties. The dimensions of the molded body 11 are, for example, 22 mm in length×8 mm in width×8 mm in height (excluding the cylindrical protrusion 11*a* on the rear upper surface), and the cylindrical protrusion 11*a* has a height of 5 mm.

The cord 13 is pulled out upward from the rear upper surface of the molded body 11 through the protrusion 11*a*. At the terminal end of the cord 13, an annular slip-off preventive member 15 is fitted on the cord 13. This slip-off preventive member 15 intrudes into the outside surface of the cord 13, and also intrudes into the inside surface of the protrusion 11*a* of the molded body 11, by which the cord 13 is prevented from slipping off.

The mounting member 14 is a plate member made of a non-magnetic material such as aluminum. This plate member is bent into an L shape, and the vertical portion thereof is attached to the molded body 11 by being embedded in the molded body 11. The horizontal portion of the mounting member 14 projects from the lower surface of the molded body 11 so as to be in parallel with the lower surface in order to effect fixation with a band.

The electric circuit 12 is made up of a reed switch 12a serving as a magnetic induction switch, an LED 12*b* serving as a light emitting device, a resistor 12*c*, a ZD 12*d*, and so on, and is enclosed completely in the molded body 11 together with the end portion of the cord 13. These components are held and fixed in the molded body 11 without the use of a board.

The proximity switch 10 of this embodiment is manufactured as described below.

The mounting member 14, the electric circuit 12, and the end portion of the cord 13 are set in advance in a mold having an internal shape corresponding to the external shape of the proximity switch 10. In this state, a light-transparent colored resin is poured into the mold and solidified. The solidified resin is removed from the mold, whereby the proximity switch 10 is manufactured.

When the manufactured proximity switch 10 is used, a band is put on the projecting portion (horizontal portion) of the mounting member 14, by which the proximity switch 10 is fixed to the surface of a to-be-mounted member 50. Thereby, the fixation can be effected without applying an external force to the molded body 11.

The features of the proximity switch 10 of this embodiment are as described below.

Firstly, the proximity switch 10 has high waterproofness. Specifically, the molded body 11 is also used as a case, and a case is not used separately. Therefore, the molded body 11 is not damaged by the change in volume or properties. Also, since the electric circuit 12 is, together with the end portion of the cord 13, enclosed completely in the molded body 11, and even the LED 12*b* is not exposed to the outside, there is no gap. Even a gap produced between the cord 13 and the molded body 11 is sufficiently sealed by wetting etc. in molding. Therefore, the proximity switch 10 has high waterproofness, and has far less danger of poor insulation caused by the entrance of liquid and malfunction caused by the poor insulation even if it is used for a long period of time in an atmosphere where liquids such as cutting oil and coolant are scattered. For this reason, the proximity switch 10 can be used while being immersed in a liquid.

Secondly, the proximity switch 10 is inexpensive because an expensive resin case is not used and its assembly is not needed.

Thirdly, since the electric circuit 12 is enclosed in the molded body 11, the proximity switch 10 can be manufactured without providing a board for the electric circuit 12. Therefore, the omission of board can reduce the cost. In order to enhance the light emitting property of the molded body 11, described later, it is preferable to eliminate the board that shields the light.

Fourthly, the proximity switch 10 is small in size because of the omission of the resin case.

Fifthly, the shape of the proximity switch 10 can be diversified because the switch is resin molded without the use of the resin case.

Sixthly, with the light emission of the LED 12*b*, the light diffuses in the molded body 11, and effects refraction, reflection, and the like on the surface, by which the whole of the molded body 11 emits light effectively. Therefore, the light emission can be checked from a wide range. The light emitting property of the molded body 11 is especially high when the color of the light-transparent resin used for the molded body 11 and the color of the emitted light of the LED 12*b* are in the same class.

Figure 3:
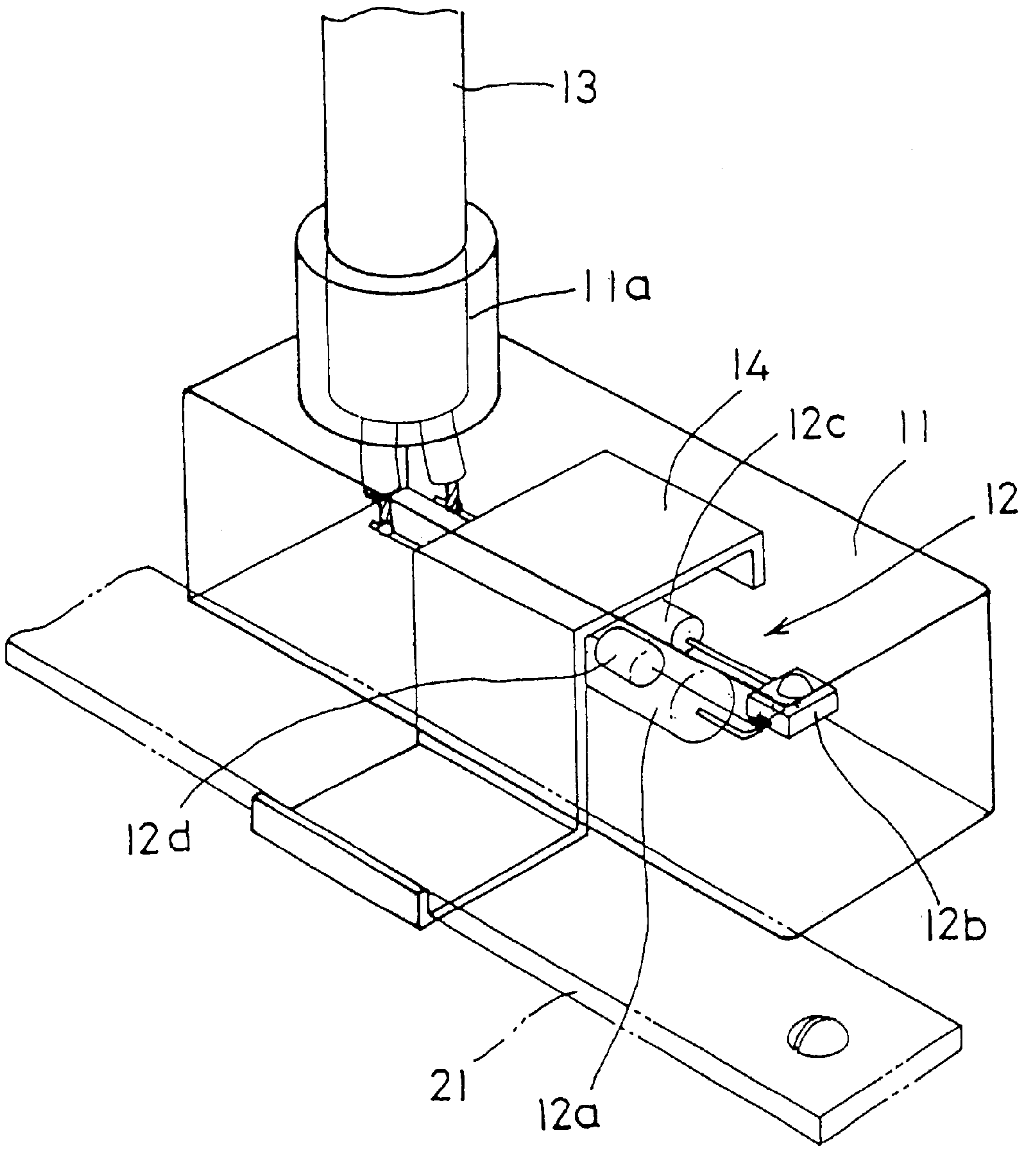
FIG. 3 is a perspective view of a proximity switch in accordance with a second embodiment of the present invention.

FIG. 3 shows a second embodiment of the present invention. This embodiment differs from the aforementioned first embodiment in the shape of the mounting member 14. For the mounting member 14 used in this embodiment, a part thereof projects to the side from the lower edge of the side surface of the molded body 11. By pushing this projecting portion by using a rail 21, the proximity switch 10 is fixed to the to-be-mounted surface.

When this mounting member 14 is used, the proximity switch 10 can be moved along the rail 21, so that the fixing position can be adjusted easily by this movement.

Figure 4:
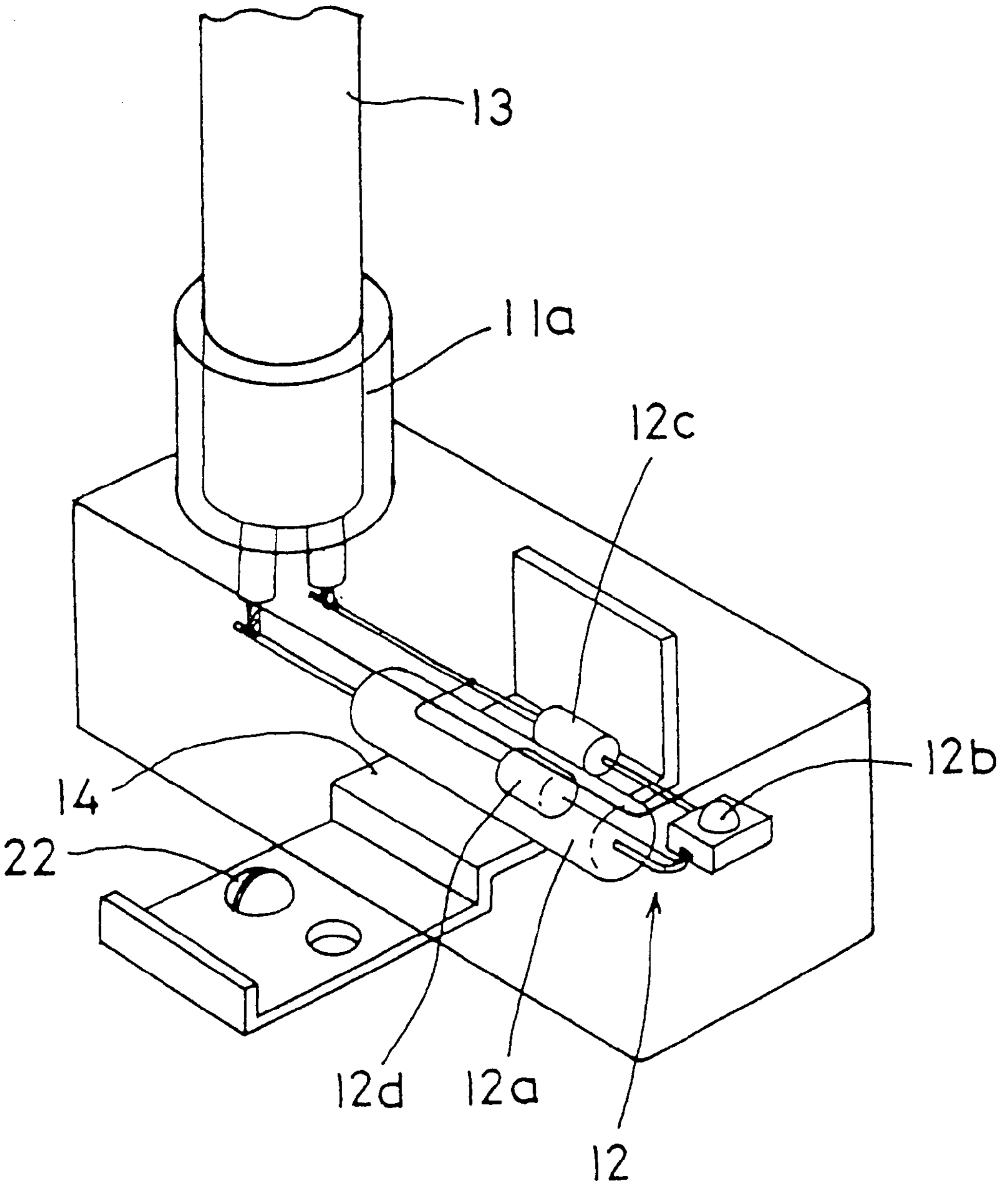
FIG. 4 is a perspective view of a proximity switch in accordance with a third embodiment of the present invention.

FIG. 4 shows a third embodiment of the present invention. This embodiment differs from the aforementioned first and second embodiments in the shape of the mounting member 14. For the mounting member 14 used in this embodiment, a part thereof projects to the side from the lower edge of the side surface of the molded body 11. By fixing this projecting portion to the to-be-mounted surface with screws 22, the proximity switch 10 is mounted.

In the case where either one of these mounting members 14 is used, the proximity switch 10 can be mounted without applying an external force to the molded body 11.

Figure 5:
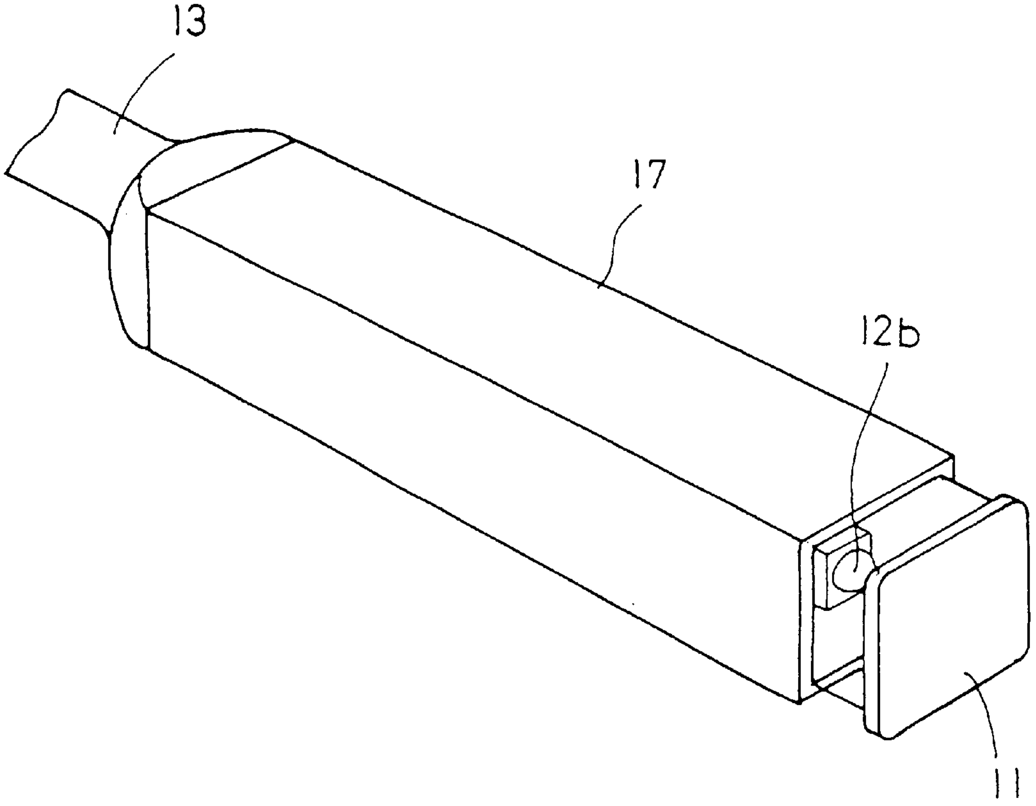
FIG. 5 is a perspective view of a proximity switch in accordance with a fourth embodiment of the present invention.
Figure 6:
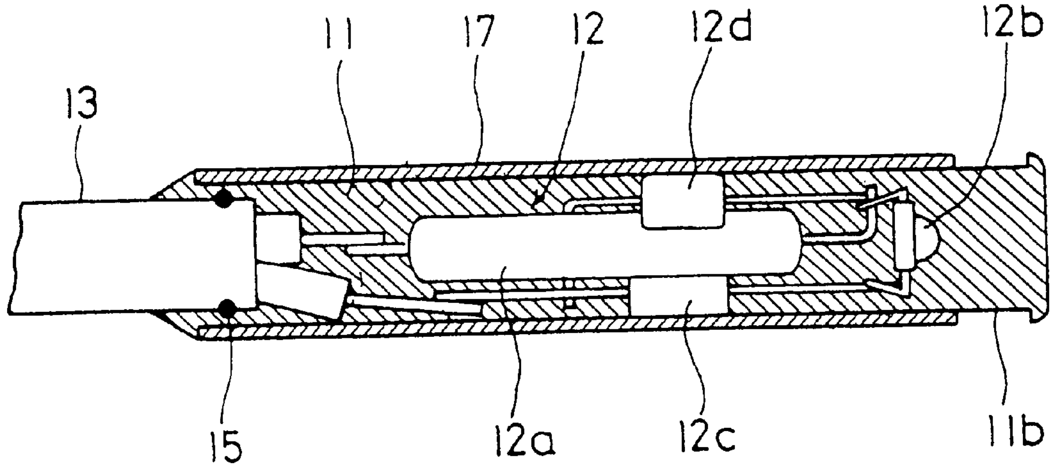
FIG. 6 is a longitudinal sectional view of a proximity switch in accordance with a fourth embodiment of the present invention.

FIGS. 5 and 6 show a fourth embodiment of the present invention. This embodiment differs greatly from the aforementioned first, second, and third embodiments in that the molded body 11 is surrounded and reinforced by a square tube shaped sheathing member 17.

The sheathing member 17, made of a non-magnetic material such as aluminum, surrounds the molded body 11 excluding the tip end portion thereof. The electric circuit 12 including the LED 12*b* lies on the inside of the sheathing member 17, and the LED 12*b* is arranged at the most frontal portion so as to face forward.

For the proximity switch 10 in this embodiment, since the molded body 11 is reinforced by the sheathing member 17, a band can be put directly around the molded body 11 in mounting. Also, the front portion of the molded body 11 is exposed to the outside of the sheathing member 17, and this exposed portion 11*b* is illuminated from the rear by the LED 12*b* provided on the inside of the sheathing member 17, by which light is emitted effectively.

Figure 7:
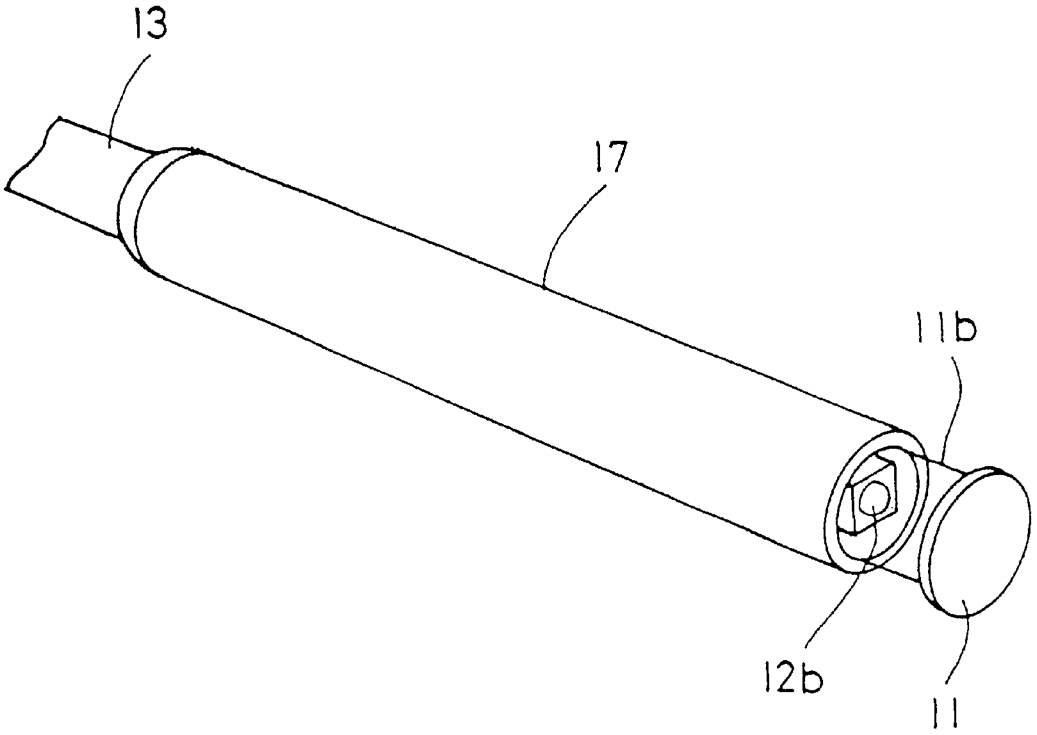
FIG. 7 is a perspective view of a proximity switch in accordance with a fifth embodiment of the present invention.
Figure 8:
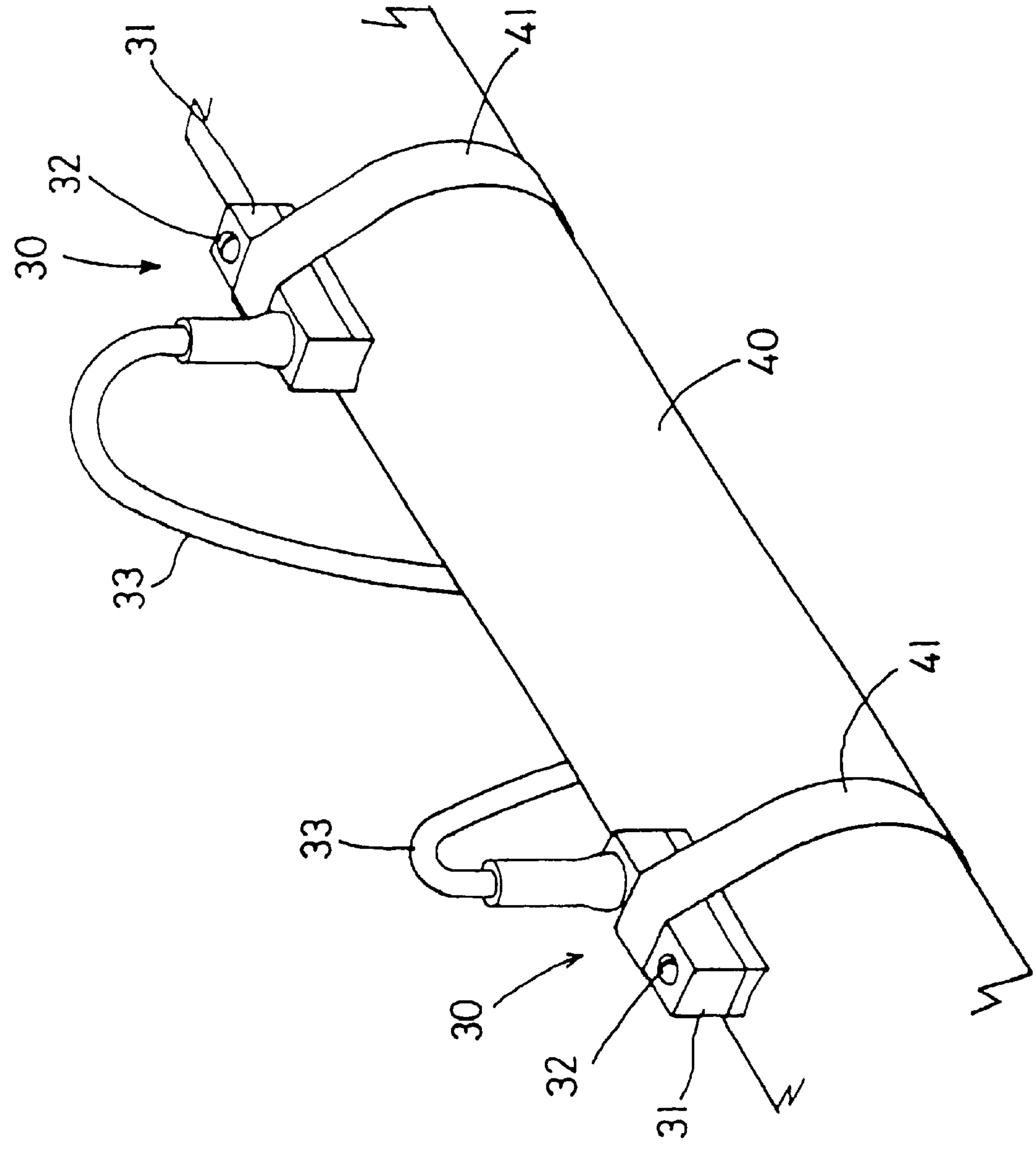
FIG. 8 PRIOR ART
FIG. 8 is a perspective view of a conventional proximity switch.

FIG. 7 shows a fifth embodiment of the present invention. This embodiment differs from the aforementioned fourth embodiment in that the molded body 11 has a columnar shape, and also differs in that a cylindrical sheathing member 14 is used in connection with the columnar molded body 11. This sheathing member 14 also surrounds the molded body 11 excluding the tip end portion thereof, and reinforces the molded body 11.

Although a contact-type reed switch has been used as a magnetic induction switch in the above embodiments, a contact-type switch other than reed switch can be used. Further, a contactless-type switch can also be used. The light emitting device is not limited to an LED, and a device other than LED can be used. Including these components, the specific configuration of electric circuit is not subject to any restriction.

Also, although the proximity switch in accordance with the present invention is used for displaying the operation position of a fluid pressure cylinder, float, and the like, the application thereof is not subject to any special restriction.

As described above, the proximity switch in accordance with the present invention uses a resin molded construction using a light-transparent resin in place of a resin case, so that the proximity switch is inexpensive and small in size, has high waterproofness and a wide light emission range, and can easily accommodate the diversification of shape. Therefore, the proximity switch is especially suitable for displaying the operation position of a fluid pressure cylinder, float, and the like.

What is claimed is:

1. A proximity switch comprising:

a molded body made of a light-transparent resin;

an electric circuit including a magnetic induction switch and a light emitting device adapted to emit light, and enclosed in the molded body; and a cord pulled out from the electric circuit to the outside of the molded body, wherein the molded body is adapted to diffuse the emitted light such that the emitted light is emitted through an entire portion of the molded body.

2. A proximity switch according to claim 1, wherein a mounting member, made of a non-magnetic material, and adapted to fix the proximity switch to a mountable surface is attached to the molded body by embedding a part thereof in the molded body.

3. A proximity switch according to claim 2, wherein at the end portion of the cord enclosed in the molded body, an annular slip-off preventive member is fitted on the cord so as to intrude into the surface of the cord.

4. A proximity switch according to claim 1, wherein the molded body is reinforced by a tubular sheathing member made of a non-magnetic material, and a part of the molded body is exposed from the sheathing member.

5. A proximity switch according to claim 4, wherein at the end portion of the cord enclosed in the molded body, an annular slip-off preventive member is fitted on the cord so as to intrude into the surface of the cord.

6. A proximity switch according to claim 1, wherein at the end portion of the cord enclosed in the molded body, an annular slip-off preventive member is fitted on the cord so as to intrude into the surface of the cord.

7. A proximity switch comprising:

a molded body made of a light-transparent resin and serving as a resin case;

an electric circuit including a magnetic induction switch and a light emitting device, enclosed in the molded body during a process of molding; and a cord pulled out from the electric circuit to the outside of the molded body, wherein the molded body is adapted to emit light through an entire portion thereof.

8. A proximity switch according to claim 7, comprising:

a mounting member embedded into a part of the molded body and adapted to fix the proximity switch to a mountable surface.

9. A proximity switch according to claim 7, comprising:

an annular slip-off preventive member fitted on an end portion of the cord enclosed in the molded body so as to penetrate the surface of the cord.

10. A proximity switch according to claim 7, wherein the light-transparent resin is colored.

11. A proximity switch according to claim 7, wherein the electric circuit has a configuration without a substrate.

12. A proximity switch comprising:

a molded body made of a light-transparent resin and serving as a resin case;

an electric circuit including a magnetic induction switch and a light emitting device, enclosed in the molded body during a process of molding;

a cord pulled out from the electric circuit to the outside of the molded body; and a reinforced member surrounding the molded body, comprising a prismatic or cylindrical sheathing member made of a non-magnetic material, wherein the front part of the molded body is exposed from the sheathing member and is irradiated from behind by the light emitting device provided inside the sheathing member in order to emit light.

13. A proximity switch according to claim 12, comprising:

an annular slip-off preventive member fitted on an end portion of the cord enclosed in the molded body so as to penetrate into the surface of the cord.

14. A proximity switch according to claim 12, wherein the light-transparent resin is colored.

15. A proximity switch according to claim 12, wherein the electric circuit has a configuration without a substrate.

* * * * *